United States Patent [19]
Ejima et al.

[11] Patent Number: 5,159,502
[45] Date of Patent: Oct. 27, 1992

[54] DATA RECORDING APPARATUS

[75] Inventors: Naoki Ejima, Osaka; Kinji Kawamoto, Kyoto, both of Japan

[73] Assignee: Matsushita Electric Industrial Co., Ltd., Osaka, Japan

[21] Appl. No.: 578,917

[22] Filed: Sep. 7, 1990

[30] Foreign Application Priority Data

Sep. 8, 1989 [JP] Japan .................................. 1-233233
Sep. 14, 1989 [JP] Japan .................................. 1-238525

[51] Int. Cl.⁵ .............................................. G11B 5/09
[52] U.S. Cl. ........................................ 360/62; 360/32
[58] Field of Search ............................. 360/32, 60, 61

[56] References Cited

U.S. PATENT DOCUMENTS 4,839,733 6/1989 Karamon et al. ..................... 360/61
5,057,947 10/1991 Shimada .............................. 360/60

FOREIGN PATENT DOCUMENTS 0297242 1/1989 European Pat. Off. .
0328131 8/1989 European Pat. Off. .
62-132233 6/1987 Japan .
62-167673 7/1987 Japan .
113260 1/1989 Japan .
113261 1/1989 Japan .
8605057 8/1986 PCT Int'l Appl. .

Primary Examiner—Vincent P. Canney
Attorney, Agent, or Firm—Lowe, Price, LeBlanc & Becker

[57] ABSTRACT

A data recording apparatus includes a digital input processing circuit, an analog input processing circuit including an A/D converter for recording the analog input signal in digital form, a switch for selecting either digital or analog input signals for recording, and a control circuit. Normally, the apparatus records the digital input signal. When the digital input processing circuit detects a synchronizing error or inhibition of recording the digital input signal (digital copy) by analyzing the sub-code signal of the digital input signal, the control circuit controls the selecting switch so as to select the analog input signal. In order to reduce unnatural level variation due to change of selection between the digital and analog input signals, there are further provided a polarity change circuit, variable delay, and variable gain amplifier for the analog audio signal.

20 Claims, 11 Drawing Sheets

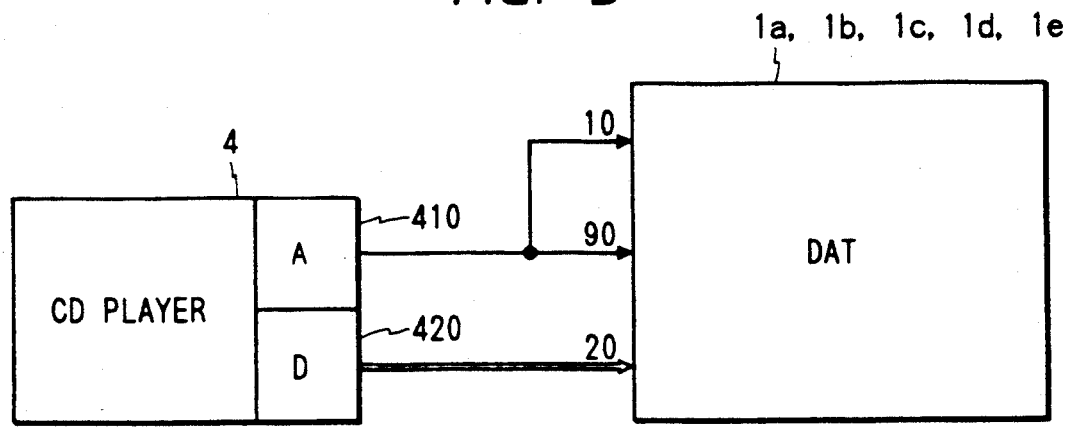
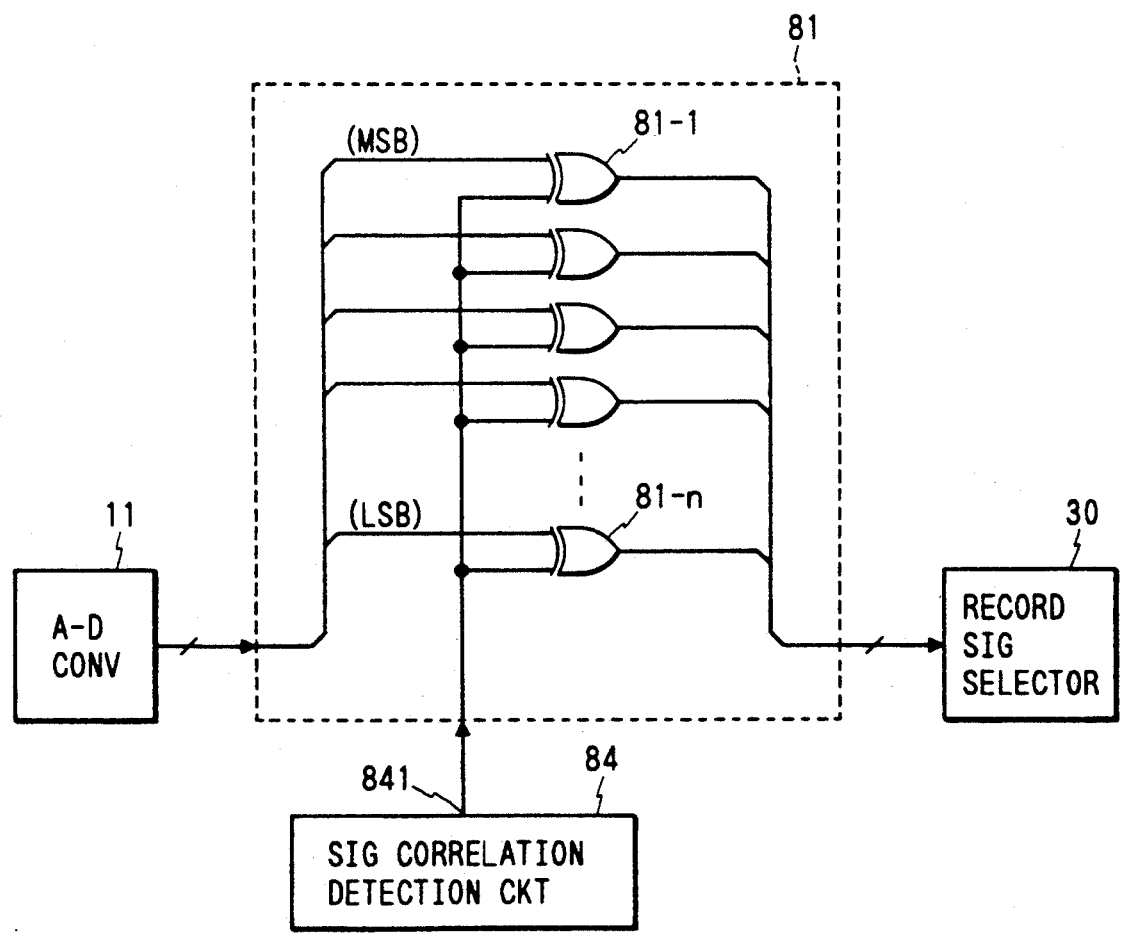

DATA RECORDING APPARATUS

TECHNICAL FIELD

This invention relates to a data recording apparatus.

BACKGROUND ART

A data recording apparatus capable of selectively recording digital and analog audio signals is known. A product of Matsushita Electric Industry Corp. (Model Number SV-D1000) has been sold since 1987 as a digital audio tape recorder (hereinbelow also referred to as DAT). FIG. 10 is a block diagram of this DAT. In FIG. 10, numeral 11 indicates an A/D converter. Numeral 21 indicates a digital input decoder for decoding a digital input signal, from a terminal 20. The input is specified by a standard (IEC-958) specifying digital audio interfaces used to produce digital audio and sub-code signals. Numeral 22 indicates a digital copy control signal detection circuit for detecting a digital copy control signal included in the sub-code signal. Numeral 24 indicates a synchronizing error detection circuit for detecting errors in bit synchronizing or frame synchronizing. Numeral 30 indicates a record signal selector for selecting either an output signal of the A/D converter 11 or an output signal of the digital input decoder 21. Numeral 31 indicates a muting processing circuit for muting the record signal. Numeral 400 indicates a system controlling section for controlling operation of the system. The system controlling section 400 includes a microprocessor for controlling the whole system using communication through its input and output ports with peripheral circuits as well as inherent logical calculation processing capabilities. Since the structure of the microprocessor (mpu) is well-known, a detailed description is not necessary. FIG. 11 is a flow chart of the control operation of the prior art DAT shown in FIG. 10. A program stored in the system controlling section 400 is provided such that the system controlling section 400 operates in accordance with the flow chart of FIG. 11. Numeral 410 included in the system controlling section 400 indicates a permission/inhibition determination section for making a determination as to permission/inhibition of digital copying in accordance with the digital copy controlling and synchronizing error detection signals. Numeral 420 indicates a digital copying recording controlling signal generation section included in the system controlling section for generating a digital controlling signal to be recorded on a recording medium. Numeral 51 indicates a sub-code encoder for converting the digital copy controlling signal into a sub-code formatted signal. Numeral 50 indicates a record signal processing circuit for converting the audio digital and sub-code signals into a record format signal. Numeral 52 indicates a recording circuit. Numeral 53 indicates a head. Numeral 54 indicates a magnetic tape. Numeral 60 indicates a operation switch and numeral 70 is an indicator.

Operation of a conventional data recording apparatus having the above-mentioned structure is described with reference to FIG. 11, a flow chart of the operation control of the system controlling section 400. When a command for the digital copy mode is made by the operation switch 60 (step 202), an operation mode controlling section 430 included in the system controlling section 400 controls the record signal selector 30 to select the digital input signal at terminal 20. At the same time, the mpu detects synchronizing condition and determines permission/inhibition of digital copying. If the result of the determination indicates "permission", the mpu places the recording circuit 52 in recording state (step 205) with the digital copy control signal. If the result shows "inhibition", the mpu prevents the recording circuit 52 from being in the recording state and indicates that "digital copying is forbidden" by providing a flickering indication to show a user that some counter operation (step 206) is appropriate.

After the start of the recording operation (step 205) with selection of the digital input signal, the mpu detects synchronizing error and digital copy controlling signal (steps 207 and 209). If synchronizing is not in error and the digital copy controlling signal indicates permission for copying, the mpu maintains the digital copying operation (step 211). If synchronizing is in error and the digital copy controlling signal indicates inhibition of copying, the mpu controls the muting processing circuit 31 so that a muted signal is recorded step 212).

An error in synchronizing may occur because the receiving side cannot respond to a change in the sampling frequency when the sampling frequency of the digital signal is changed. For example, when a satellite broadcasting signal is received directly, a synchronizing error occurs when the mode is changed between the A mode and B mode. This is because the sampling frequencies of A and B modes are different from each other. Then, during the synchronizing error interval, the muted signal is recorded. Further, if the number of copies permitted is specified and recorded on a recording medium for copyright purposes, when this magnetic tape is reproduced, the digital copying controlling signal may change from permission to inhibition of digital copying. Thus, if copying is carried out from such a magnetic tape to another magnetic tape, some portion of the other magnetic tape would include muted portions so that the copied tape would be different from one that the operator intended to make. In other words, the recorded program would not be continuous.

According to the above-mentioned conventional system, the operator can carry out digital copying if the operator acknowledges that the input signal is one permitted for digital copying. However, if the operator does not know such information and tries to select the digital copy mode to record the input signal he does not know if digital copying will be successful. As stated, it is very inconvenient when the operator does not know whether digital copying is permitted or not when he is recording the digital audio input signal by the DAT because there are digital audio signals for which digital copying is both permitted and not permitted. The problem has been dealt with in the following manner.

If an analog signal is available from the same source and includes the same content as the digital audio signal, the analog signal is supplied to the analog signal input terminal 10 and then the apparatus is placed into analog recording mode in response to the operation switch 60. Then the content can be copies using the analog signal instead of the digital signal. Further, if a synchronizing error develops during digital copying or a control signal indicative of inhibition of digital copying is detected during digital copying, a muted signal is recorded and an alarm is activated. In response to this, the operator temporarily stops recording and then changes the apparatus into the analog recording mode with the operation switch 60, so that he can copy the analog signal having the same content as the digital audio signal. However, it is very inconvenient for the operator to monitor the recording condition continuously in order to change the signal being recorded and to change the operation mode of the apparatus as necessary. Further, even though the problem of attempting to record muted signals is removed, another problem arises, a portion of the content of the input signal is missing due to recording stoppage. In other words, the sound or the program recorded on the magnetic tape is discontinuous.

SUMMARY OF THE INVENTION

The present invention has been developed in order to remove the above-described drawbacks inherent to the conventional data recording apparatus.

In order to alleviate these problems, the present invention provides a data apparatus for maintaining copying operation even if the condition of the digital input signal changes during digital copying.

A data recording apparatus includes a digital input processing circuit, an analog input processing circuit including an A/D converter for recording the analog input signal in a digital form, a switch for selecting either a digital or analog input signal for recording, and a control circuit. Normally, the apparatus records the digital input signal. When the digital input processing circuit detects a synchronizing error or inhibition of recording the digital input signal (digital copy) by analyzing the sub-code signal of the digital input signal, the control circuit controls the switch so as to select the analog input signal. In order to reduce variations due to switching between the digital and analog input signals, there are further provided a polarity change circuit, variable delay, and variable gain amplifier.

According to the present invention there is provided a first data recording apparatus including: an A/D converter for converting an analog input signal; a digital decoder for decoding a digital input signal to obtain digital data and a synchronizing signal; a selector responsive to a control signal for selecting either an output of the A/D converter or the digital data for recording; synchronizing error detector for detecting synchronizing error through comparison between the synchronizing signal and a reference synchronizing signal; and a controller responsive to an output of the synchronizing error detector for producing the control signal to cause the selector to select the output of the A/D converter when synchronizing error is detected.

According to the present invention there is also provided a second data recording apparatus including: an A/D converter for converting an analog input signal; a digital decoder for decoding digital input signal to obtain a digital data and a sub-code signal; a selector for selecting either an output of the A/D converter or the digital data in response to a control signal; a detector responsive to the sub-code signal for detecting a copy control signal indicative of permission and inhibition of recording with the digital input signal; and a controller responsive to the detected copy control signal for producing the control signal to cause the selecting means to select the output of the A/D converter when the inhibition is detected.

In each of the first and second apparatus, there is an unnatural variation of the output level of the selector due to change of selecting input signals by selector. Thus, a polarity changing circuit can be provided to the first and second apparatus to conform the polarity of the analog signal or that of the digital input signal. Further, a variable delay circuit may be provided to the first and second apparatus to conform the phase of the analog signal to that of the digital input signal. Further, a variable gain amplifier may be provided to the first and second apparatus to conform the amplitude of the analog signal to that of the digital input signal. Also, a muting circuit may be provided to the first and second apparatus to mute the input signal when synchronizing error and inhibition of copy are detected respectively.

BRIEF DESCRIPTION OF DRAWINGS

The object and features of the present invention will become more readily apparent from the following detailed description taken in conjunction with the accompanying drawings in which:

FIG. 3 shows an interconnection between the apparatus of the present invention and an external apparatus, which is suited for the various embodiments of the invention disclosed throughout the specification.

FIG. 4 is a block diagram of polarity changing circuit shown in FIGS. 1, 8 and 9;

The same or corresponding elements or parts are designated at like references throughout the drawings.

DETAILED DESCRIPTION OF THE INVENTION

Figure 1:
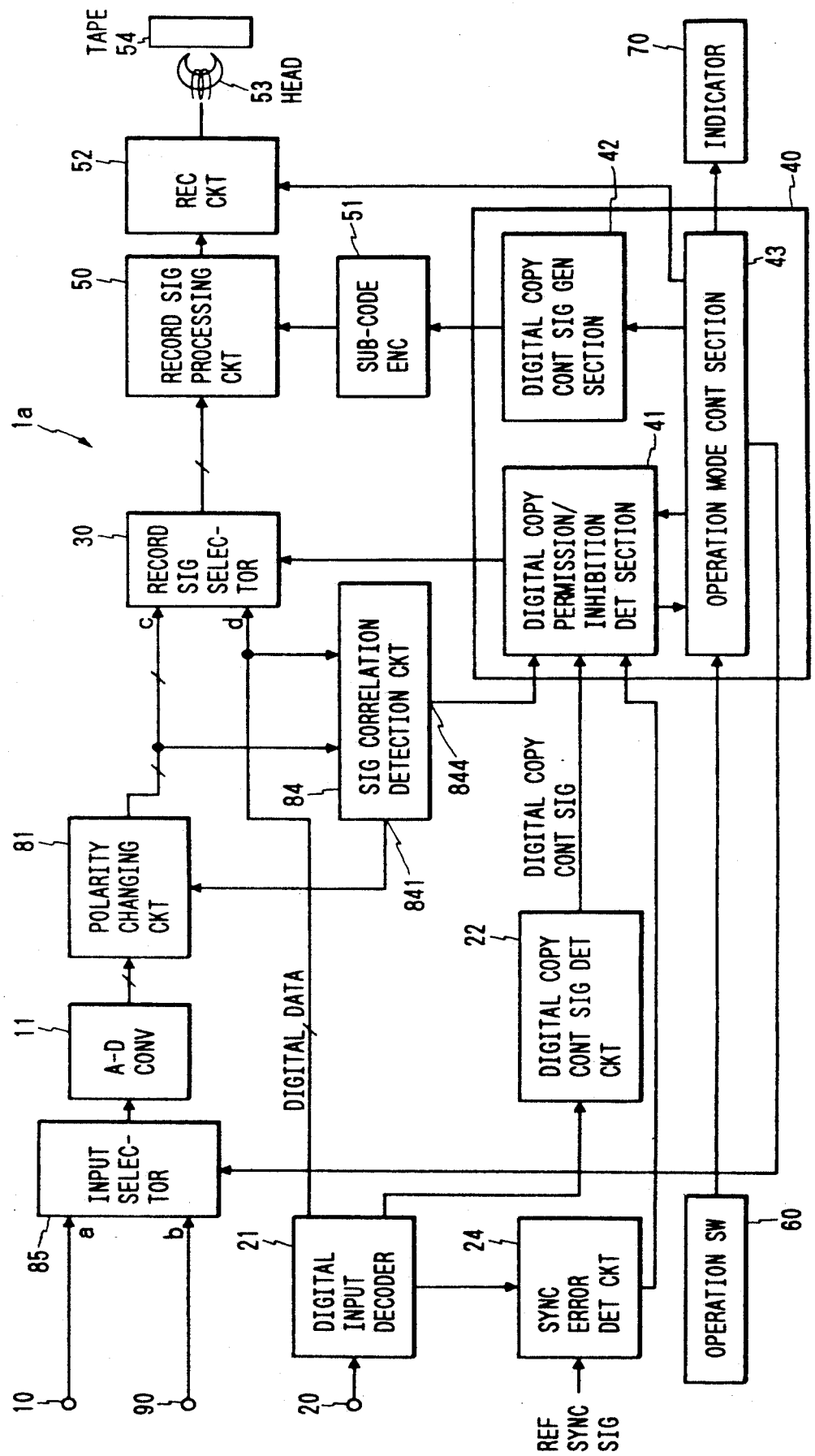
FIG. 1 is a block diagram showing a first embodiment of a data recording apparatus of the invention.
Figure 2:
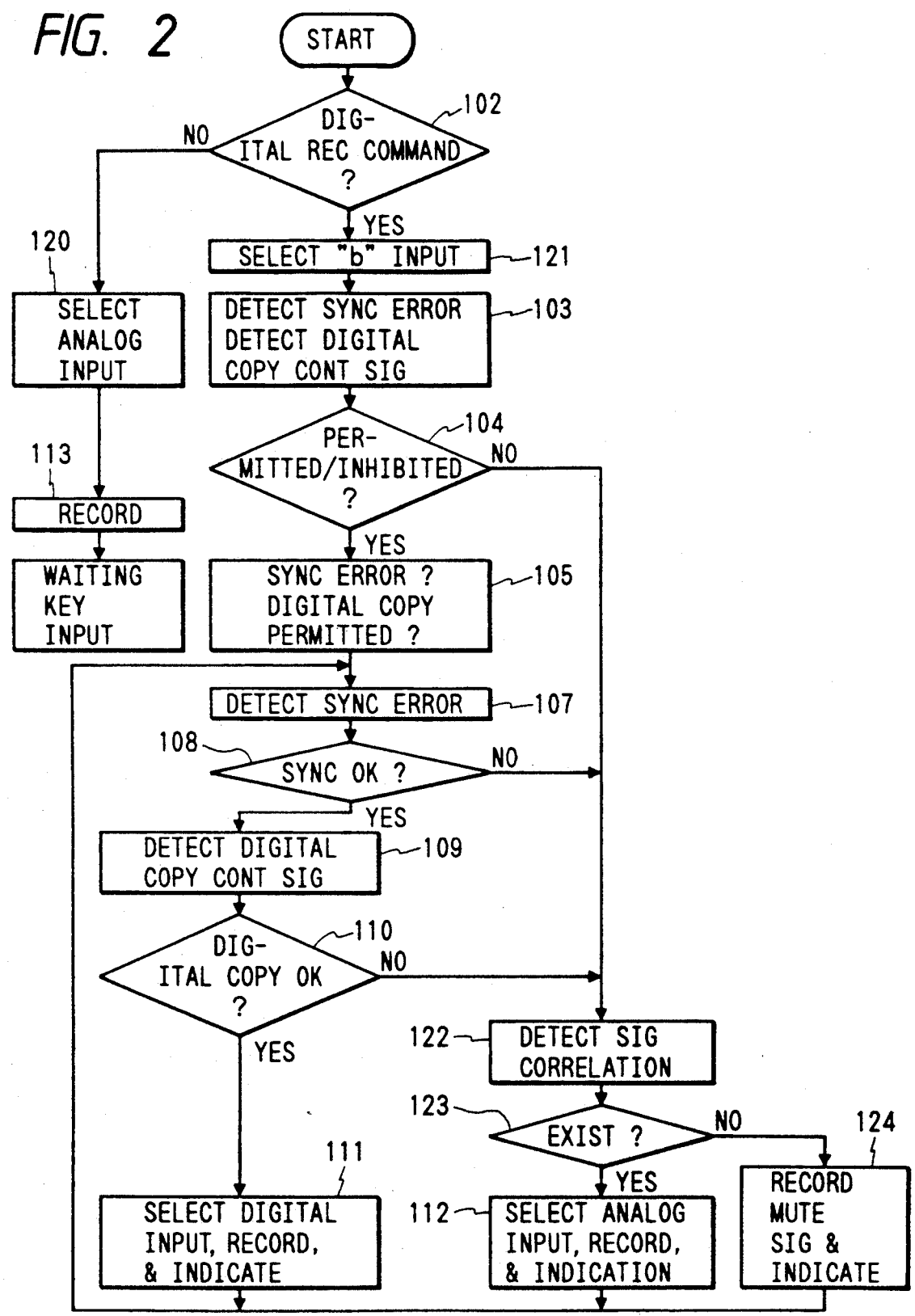
FIG. 2 is a flow chart of the control operation of the data recording apparatus of various embodiments of the present invention as discussed throughout the specification.

FIG. 1 is a block diagram showing a first embodiment of the data recording apparatus of the present invention. FIG. 2 is a flow chart showing the control operation of the DAT shown in FIG. 1 of the first embodiment of the invention. In FIG. 1, an analog audio input signal is applied to the "a" input of an auxiliary input selector 85 through a terminal 10. Another analog audio input signal is also applied to the "b" input of the input selector 85 through a terminal 90. The auxiliary input selector 85 selects analog audio signals in response to a system controlling section 40. An output of the auxiliary input selector 85 is sent to an A/D converter 11.

A digital audio input signal from a terminal 20, specified by standard No. IEC-958 for digital audio interfaces is applied to the digital input decoder 21 for producing digital input, sub-code, and synchronizing signals. An output signal of the digital copy control signal detection circuit 22 for detecting a digital copy control signal included in the sub-code signal. The synchronizing signal is sent to a synchronizing error detection circuit 24 for detecting errors in bit synchronizing or frame synchronizing by comparison between the synchronizing signal and a reference synchronizing signal.

An output of the A/D converter 11 is sent to the "c" input of a record signal selector 30 through a polarity changing circuit 81 discussed later in this application. Input "d" of the record signal selector 30 is supplied with an output of the digital input decoder. The record signal selector 30 selects either the output signal of the A/D converter 11 or the output signal of the digital input decoder 21, i.e., digital data. An output signal of the record signal selector 30 is recorded on a magnetic tape 54 through a record signal processing circuit 50 for formatting the audio digital signal for recording together with sub-code from a sub-code encoder 51, through a recording circuit 52, using a recording head 53. The digital copy control signal detected by the digital copy control signal detection circuit 22 is sent to a system controlling section 40.

The polarity changing circuit 31 changes polarity of the output signal of the A/D converter 11. It changes the polarity relation between the output of the A/D converter 11 and the digital data. Numeral 84 indicates a signal correlation detection circuit for detecting the difference between the output of A/D converter and the digital data in polarity, magnitude, and phase for generating a polarity control signal 841 and correlation detection signal 844.

The system controlling section 40 includes a microprocessor (mpu)__ for controlling the whole system using communication through its input and output ports with peripheral circuits as well as inherent logical calculation processing capabilities. As the structure of the microprocessor (mpu) is well-known, the detailed description is omitted. FIG. 2 is a flow chart of the control operation of the first embodiment. This control scheme is common to embodiments of the invention discussed through the specification. A program stored in the system controlling section 40 is provided so that the system controlling section 40 operates in accordance with the FIG. 2 flow chart. Numeral 41 included in the system controlling section 40 indicates a permission/inhibition determination section for making determination as to permission/inhibition of digital copying in accordance with the digital copy controlling and synchronizing error detection signals. Numeral 41 indicates a digital copying recording controlling signal generation section included in the system controlling section for generating a digital control signal to be recorded on the recording medium. Numeral 51 indicates a sub-code encoder for converting the digital copy controlling signal into a sub-code formatted signal. The mpu executes the program of the FIG. 2 chart performing the functions of the digital copy permission/inhibition determination section 41, digital copy recording control signal generation section 42, and the operation mode controlling section 43. Numeral 60 indicates a operation switch. Numeral 70 indicates an indicator.

When an operator sets the apparatus to be in the digital copy mode with the operation switch 60 (step 102), the system controlling section 40 sends a control signal to the auxiliary input selector 85 so that the auxiliary input selector 85 selects a signal coming from the auxiliary analog input terminal 90 (step 121). Moreover, the system controlling section 40 controls the record signal selector 30 to select the digital input signal (step 121). Then, the system controlling section 40 detects outputs of the digital copy control signal detection circuit 22 and the synchronizing error detection circuit 24 (step 103) to determine synchronizing condition and permission/inhibition of digital copying (step 104). If the determination is "permission", the system controlling section 40 places the recording circuits into the recording state (step 105). If the determination is "inhibition", processing proceeds to step 122 where the system controlling section 40 checks an output of the signal correlation detection circuit 84 to detect correlation (step 123). If there is correlation, Section 40 controls the recording signal selector 30 to change signal selection from the digital input to the analog input signal. Thus, the signal being recorded is switched to the signal from the auxiliary analog input terminal 90 (step 112). In addition to this operation, indication of substitution recording is executed in step 112, as well as information whether there is synchronizing error or not and an indication that digital copying is permitted or inhibited is made by the indicator 70 to arouse the operator's attention. Therefore, even if the apparatus is set to the digital copying mode, it can record the input signal coming from the auxiliary analog input terminal 90, converted into a digital signal by the A/D converter 11.

FIG. 3 shows the interconnection between the apparatus of the present invention and an external apparatus, which is suited for embodiments throughout the specification. In FIG. 3, numeral 1a, 1b, 1c, 1d, or 1e indicate a DAT. Numeral 4 indicates a CD player. Numeral 410 indicates an analog signal output terminal. Numeral 420 indicates a digital signal output terminal. The DAT is connected to the CD player, as shown in FIG. 3. Thus, both the auxiliary analog input terminal 90 and the digital signal input terminal 20 are supplied with a reproduction signal from the same CD player. Therefore, when a synchronizing error or inhibition of digital copying occurs, the apparatus detects the synchronizing error or inhibition of digital copying and thus, the apparatus can automatically record the analog signal instead of the digital signal.

After starting recording (step 105 of FIG. 2) with the digital input selected, the apparatus executes detection of a synchronizing error and of a digital copy control signal (steps 107 and 109). If there is no synchronizing error and the digital copy control signal indicates permission for copying, the apparatus maintains digital copying operation (step 111). If there is a synchronizing error or the digital copy control signal indicates inhibition of digital copying (step 108), the operation proceeds to step 122 where correlation is determined with the output of the signal correlation detection circuit 845 (step 123). If there is correlation, the system controlling section 40 controls the recording signal selector 30 to change signal selection from the digital input to the analog input. Even though the apparatus is already in the digital copy mode, the apparatus can record the signal from the auxiliary analog input terminal 90 which has been converted into digital signal by the A/D converter 11. If the apparatus is interconnected as shown in FIG. 3 and a synchronizing error or inhibition of copying occurs during recording of the digital signal, the apparatus can automatically record the analog signal instead of the digital input signal in response to detecting such conditions.

The analog input recording of step 112 is included in the loop of detecting the condition of the digital input decoder, so that when a synchronizing error is corrected or inhibition is cancelled, the apparatus can return to its original state, i.e., the digital input recording condition (step 111). In this respect, this technique is different from the selected analog input recording (step 113). After correcting a synchronizing error or cancellation of inhibition, the apparatus can return automatically to the digital copying operation without deterioration of sound quality. Thus, the whole content of the program can be recorded even though the digital control signal causes inhibition of digital copying during recording of an audio signal from a magnetic tape when the number of repetitions of possible digital copying is specified. This is because a portion of the content of the input signal occurring where digital copying is not permitted can be recorded using a signal from the auxiliary analog input terminal 90 via analog circuits. Thus, the problem of a muted signal being recorded can be alleviated. Similarly, in the case of a synchronizing error, the problem of recording being interrupted or a muted portion being recorded, is removed. Moreover, in step 112, it is possible to indicate the impossibility of digital copying and to further indicate whether a synchronizing error or inhibition of digital copying causes the impossibility of digital copying. Thus, the operator can know the condition from these indications, so that the indication recovery operation when aids the synchronization error occurs.

FIG. 4 is a block diagram of a polarity changing circuit 81. In FIG. 4, the polarity changing circuit 81 includes n EXCLUSIVE OR gates designated 81-1 through 81-n one input of each being supplied with the output of the A/D converter 11 respectively, as shown in FIG. 4. Another input of each of the EXCLUSIVE OR gates is supplied with the polarity control signal 841 from the signal correlation detection circuit 84. The outputs of the EXCLUSIVE OR gates 81-1 to 81-n are sent to the record signal selector 30. Therefore, the polarity changing circuit changes polarity of the output of the A/D converter 11 in response to the polarity signal from the signal correlation detection circuit 84.

Figure 5A:
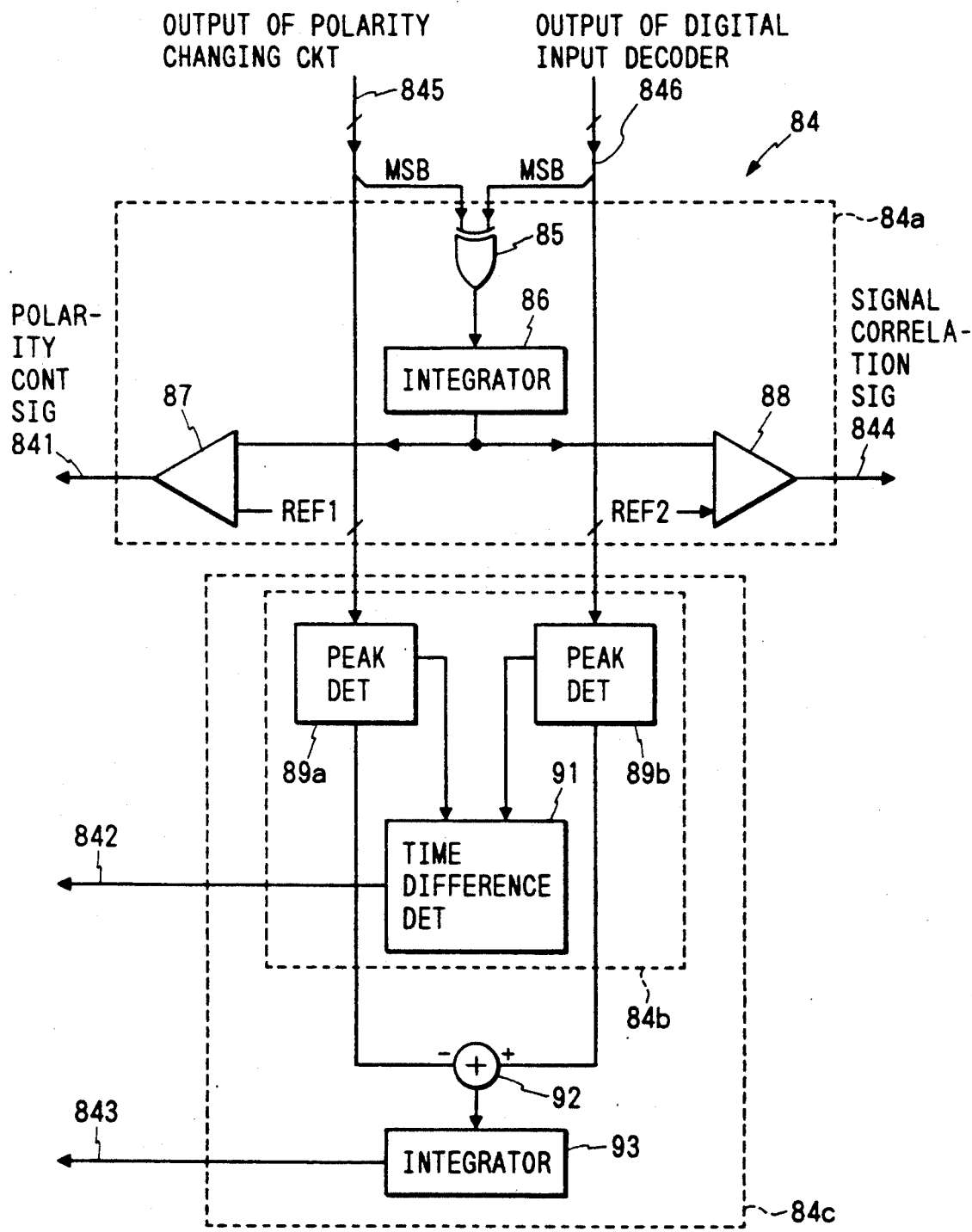
FIG. 5A is a block diagram of the signal correlation circuit 84 used for various embodiments of the invention discussed throughout the specification.

FIG. 5A is a block diagram of the signal correlation circuit 84. In FIG. 5A, the output 845 of the polarity changing circuit 81 is applied to a peak detector circuit 89a. The output of the digital input decoder is applied to another peak detector 89b. The most significant bit(MSB) of the output 845 is also applied to one input of an EXCLUSIVE OR gate 85 of circuit 84. Another input of EXCLUSIVE OR gate 85 is supplied with the MSB from the output 846. An output of the EXCLUSIVE OR gate 85 is sent to an integrator 86. An output of the integrator 86 is supplied to comparators 87 and 88. The comparators 87 and 88 are supplied with reference signals REF1 and REF2 respectively. One output designated 841 of the circuit 84a, i.e., the polarity signal from the comparator 87 is used to detect consistency of polarity between the outputs 845 and 846. the polarity changing circuit 81 changes polarity of its output signal in response to the polarity signal 841 to conform the polarity of its output with the output of the digital decoder 21. Another output designated 844 of the circuit 84a from the comparator 88 is used to determine correlation between the outputs designated 845 and 846. This is because if there is an indication of opposite polarity between outputs 845 and 846 initially, the comparator detects the polarity difference and the polarity changing circuit 81 changes its polarity. Then, the comparator 88 can detect whether there is correlation between the outputs 845 and 846 or if there is no correlation. If there is correlation between the polarities of outputs 845 and 846, the comparator 88 can immediately detect whether signal correlation exist or not. However, there are many techniques for detecting signal correlation and it is possible to detect correlation of the same polarity and the opposite polarity immediately.

Figure 5B:
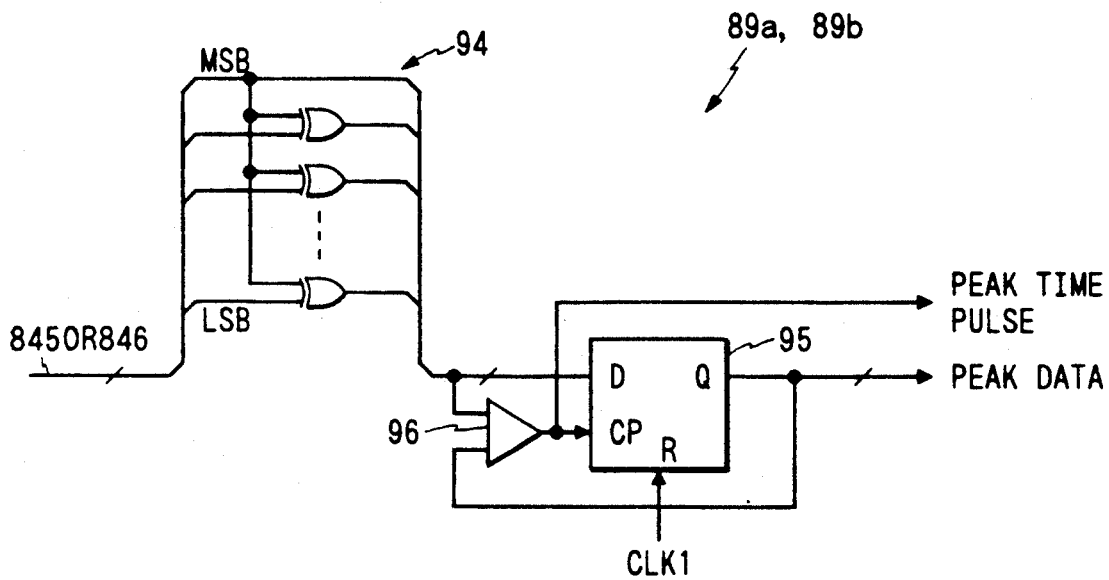
FIG. 5B is a block diagram of the peak detectors shown in FIG. 5A.

The peak detector 89a detects peak time and peak value of the output 845 to produce a peak time pulse and peak data respectively, The peak detector 89b detects peak time and peak value of the output 846 to produce a peak time pulse and peak data respectively. The peak time pulses are applied to a time difference detector 91 which detects time difference between peaks of the outputs 845 and 846. FIG. 5B is a block diagram of the peak detectors 89a and 89b. In FIG. 5B, output 845 or 846 is supplied to n EXCLUSIVE OR gates 94 as shown to detect an absolute value. The absolute value is sent to the inputs of digital comparator 96 and D latch array 95. Another input of the digital comparator 96 is supplied from the output of the D latch array 95. An output of the digital comparator 96 shows the peak time pulse. The Q output of the D latch array 95 shows the peak data. A reset input of the D latch 95 is supplied with a clock signal CLK 1 for detecting the peak time pulse and the peak data within a given time interval.

Figure 5C:
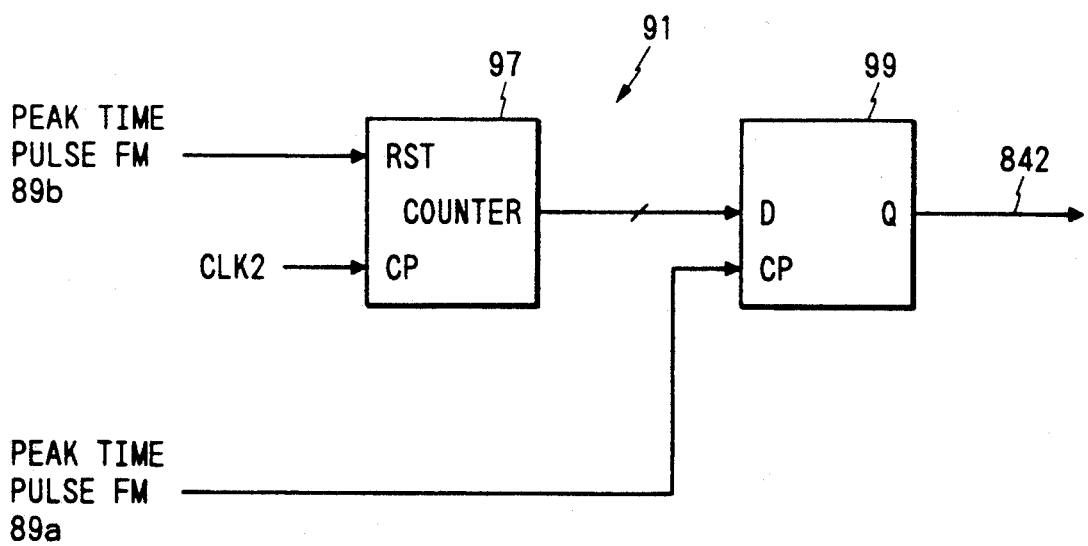
FIG. 5C is a block diagram of the time difference detector shown in FIG. 5A.

FIG. 5C is a block diagram of the time difference detector 91. The peak time pulse from the peak detector 89a is supplied to a reset input of a counter 97 having a clock pulse input supplied with a clock CLK2. Thus, the counter starts counting in response to the peak time pulse of the peak detector 89a. An output of the counter 97 is sent to a D latch 99 having a clock pulse input supplied with the peak time pulse from the peak time detector 89b. Thus, a Q output of the D latch 99 holds a data of the output of the counter 97 in response to the peak time pulse from the peak detector 89a. This data shows time difference between the peaks of the outputs 845 and 846.

The signal correlation signal designated 844 is used to determine the signal correlation between the analog signal and the digital input signal correctly after the polarity control signal 841 is produced. Thus, the mpu 40 detects the signal correlation signal with a time delay after switching the record signal selector 30.

Figure 6:
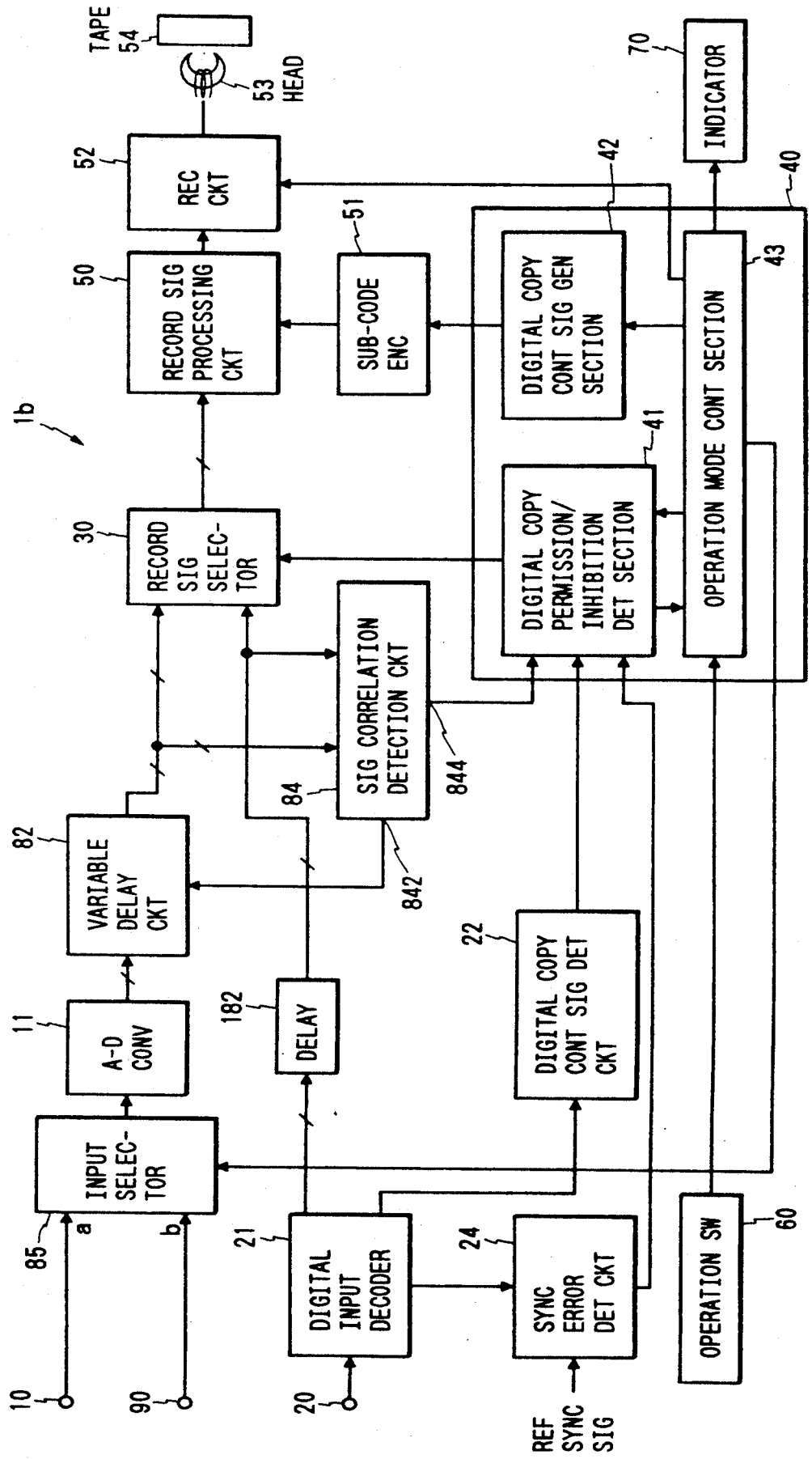
FIG. 6 is a block diagram showing a second embodiment of the present invention.

FIG. 6 is a block diagram showing the second embodiment of the invention. FIG. 2 is a flow chart also showing control operation of the second embodiments. The basic structure of the second embodiment of FIG. 6 is the same as that of the first embodiment. Different points are that a variable delay circuit 82 is provided between the A/D converter 11 and the record signal selector 30, a delay circuit 182 is provided between the A/D converter 11 and the record signal selector 30, a delay circuit 182 is provided between the digital input decoder 21 and the record signal selector 30, and the polarity changing circuit 81 is omitted. Therefore, a detailed description is not necessary and only distinguishing points are described. The variable delay circuit 82 delays the signal from the analog input by a delay time determined by the delay control signal 842. The delay circuit 182 delays the digital audio signal from the digital decoder 21 by a given delay time. Operation of the variable delay circuit 82 is described as it differs from the first embodiment.

The signal correlation detection circuit 84 detects, for a given time interval, the time difference between a point when the output signal of the aA/D converter 11 reaches a peak value in amplitude and another point when the output signal of the digital input decoder 21 reaches a peak value in amplitude. The signal correlation detection circuit 84 sends a delay control signal 842 to the variable delay circuit 82 in accordance with the detection signal. That is, it controls a delay time of the output signal of the aA/D converter 11 such that both the signal of the A/D converter 11 and the output signal of delay circuit 182 reach the record signal selection circuit 30 at the same point in time. Therefore, unnatural variation in the output level of the record signal selection circuit 30 due to change of signal selection can be reduced. Generally, the amount of delay for an analog signal is longer than that of a digital signal because there is substantial delay at the filter used for removing distortion. Therefore, the delay circuit 182 is provided in the digital input signal line and the variable delay circuit 82 is provided in the output line of the A/D converter 11 to control delay time to provide time-adjusting between the digital and analog input signals. However, in order to ensure that the digital audio signal reaches the record signal selector 30 earlier than the analog audio signal, only the variable delay circuit 82 may be provided between the A/D converter 11 and the record signal selector 30.

At start of operation the delay amount of the variable delay circuit 82 is set to the maximum by the delay control signal 842 to prevent the analog audio signal from reaching the record signal selector 30 earlier than the digital audio signal.

Figure 7:
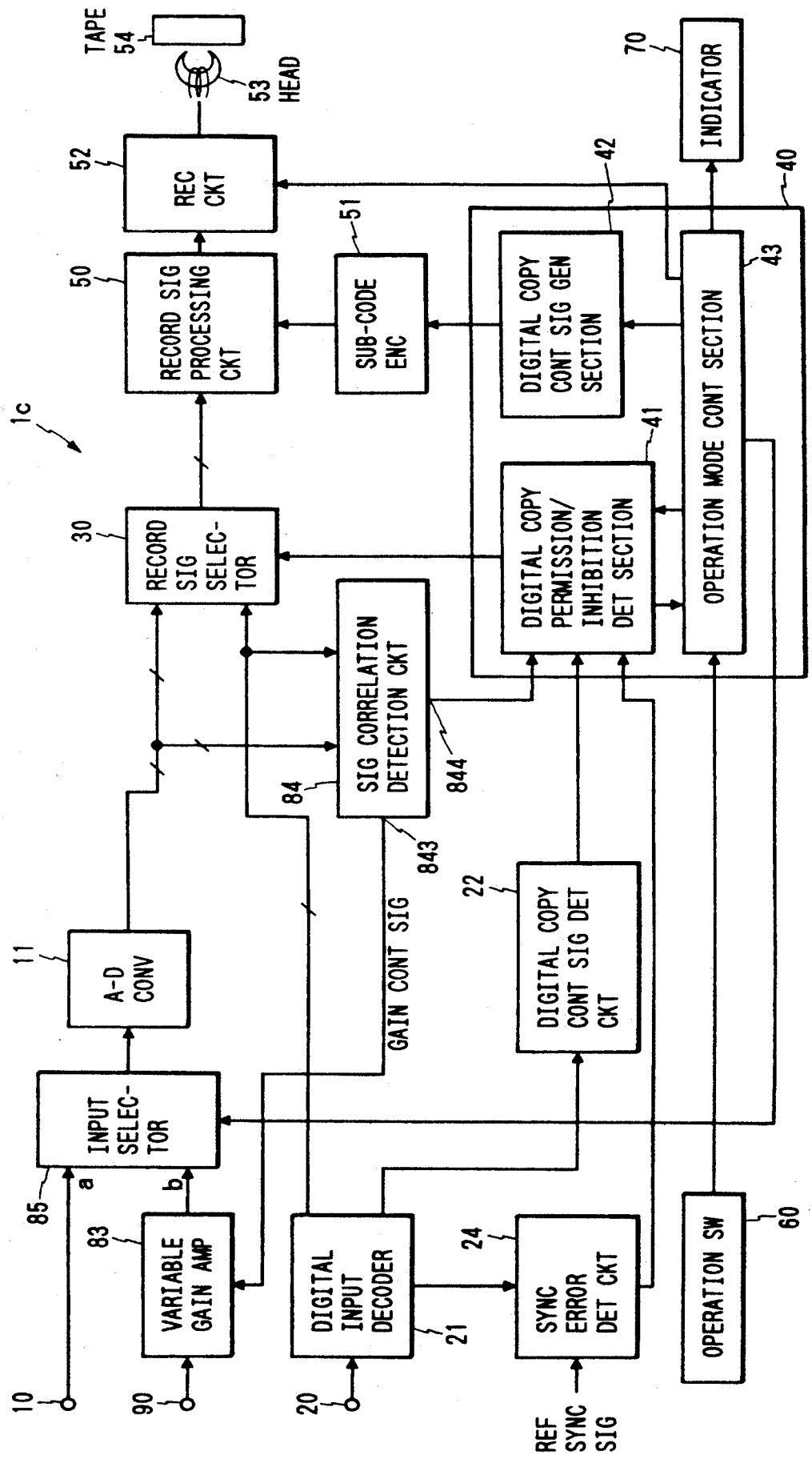
FIG. 7 is a block diagram showing a third embodiment of the present invention.

FIG. 7 is a block diagram showing the third embodiment of the invention of data recording apparatus. FIG. 2 is a flow chart also showing the control operation of the third embodiment of the invention. The basic structure of the third embodiment of FIG. 7 is the same as that of the first embodiment. Differences are the variable gain amplifier 83 provided between the input terminal 90 and the input selector 85 and the absence of polarity changing circuit 81. Therefore, a detailed description will be omitted and only distinguishing different points are described. The variable gain amplifier 83 changes the amplitude of the analog input signal in accordance with a gain control signal 843. Operation of digital copying of the data recording apparatus structured as mentioned above is described with respect to the variable gain amplifier which differs from the first embodiment. The signal correlation detection circuit 84 detects peak values of the output signal of the A/D converter 11 and the output signal of the digital input decoder 21 for a given time interval and compares them and detects any difference in amplitude of these signals. The signal correlation detection circuit 84 sends a gain control signal 843 to the variable gain amplifier 83 in accordance with the detection result. Circuit 84 controls the amplitude of the log input signal such that the amplitude of the output signal of the A/D converter 11 is made substantially equal to that of the output signal of digital signal decoder 21. Therefore, the unnatural variation in the output level of the record signal selector 30 due to change of signal selection can be reduced.

Figure 8:
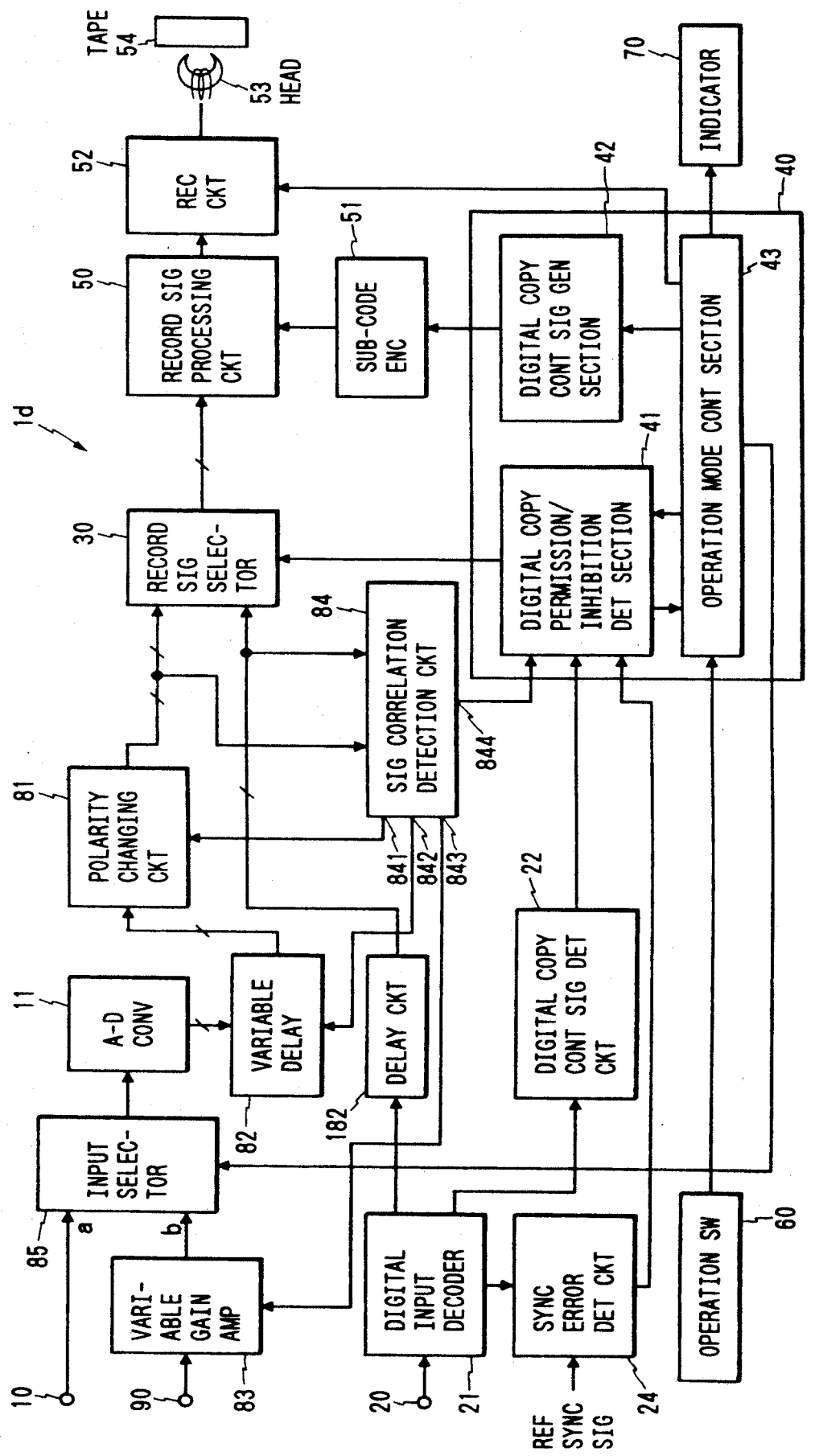
FIG. 8 is a block diagram showing a fourth embodiment of the present invention.

FIG. 8 is a block diagram showing the fourth embodiment of the present invention. FIG. 2 is a flow chart showing the control operation of the fourth embodiment of the invention. The basic structure of the fourth embodiment of FIG. 8 is the same as that of the first embodiment. Different points are that a variable delay circuit 82 and variable gain amplifier 83 are provided. Therefore, a detailed description is not necessary. In the fourth embodiment, in order to increase signal correlation, there are provided the polarity changing circuit 81, variable delay circuit 82 and variable gain circuit 83. The signal correlation detection circuit 84 supplies polarity control signal 841, delay control signal 842, and gain control signal 843 to adaptively control these circuits. Thus, it is possible to make the output signal of the A/D converter 11 substantially equal to the output signal of the A/D converter 21 in amplitude and in phase (delay and polarity) at the input of the record signal selector 30. Therefore, an unnatural variation in the output level of the record signal selector 30 when signal selection is changed can be reduced.

Figure 9:
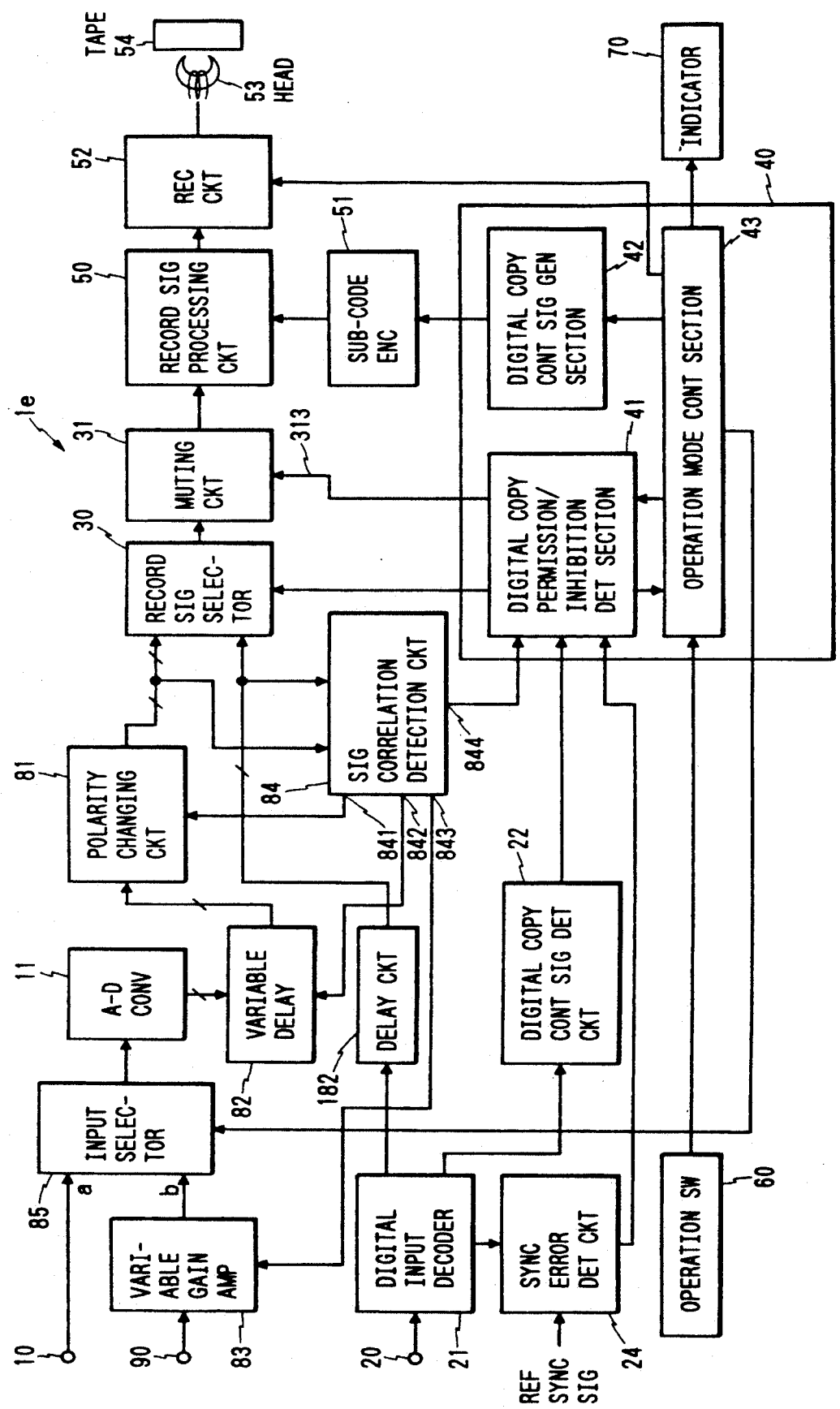
FIG. 9 is a block diagram showing a fifth embodiment of the present invention.
Figure 10:
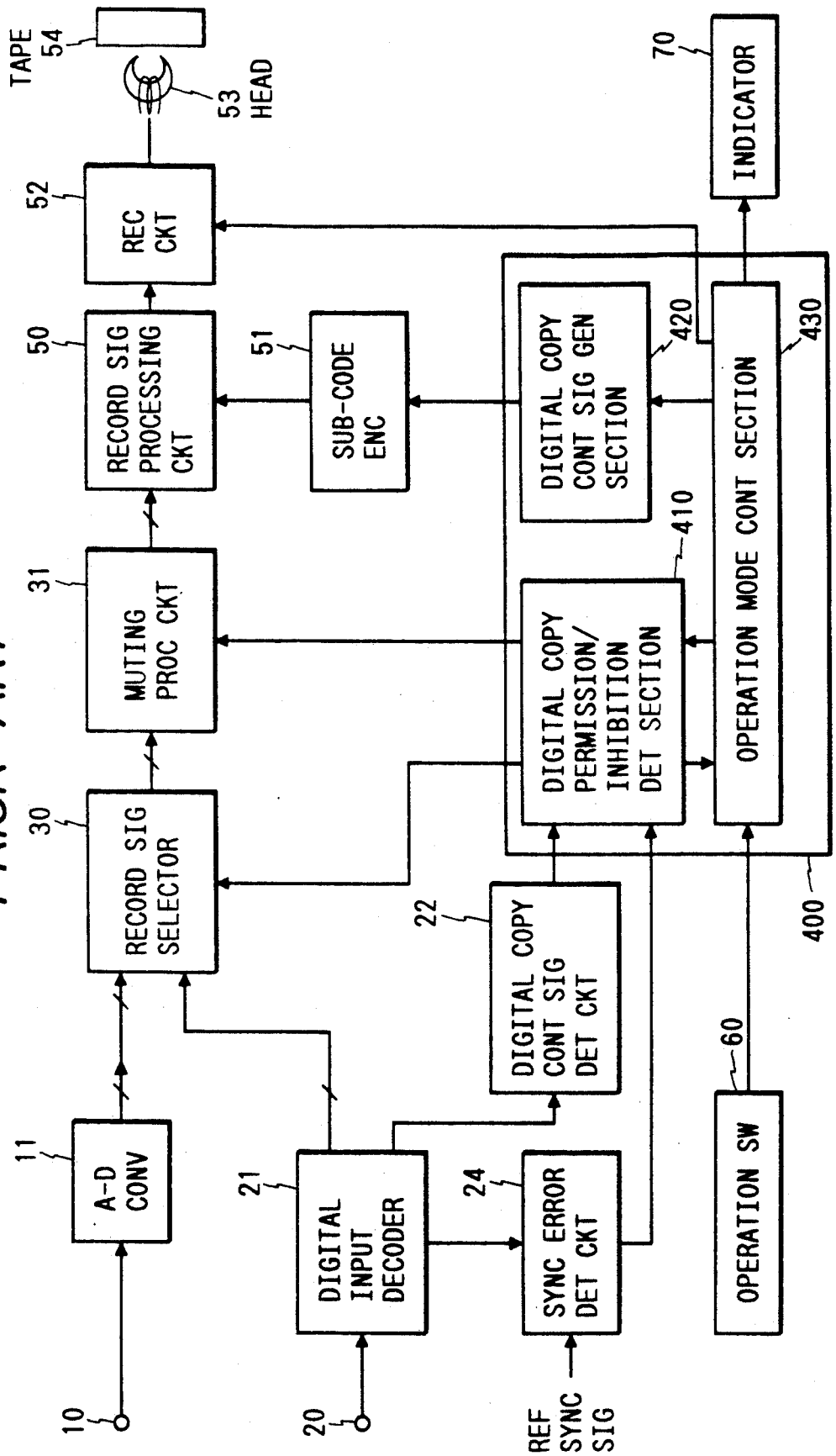
FIG. 10 is a block diagram of a conventional data recording apparatus labelled prior art.
Figure 11:
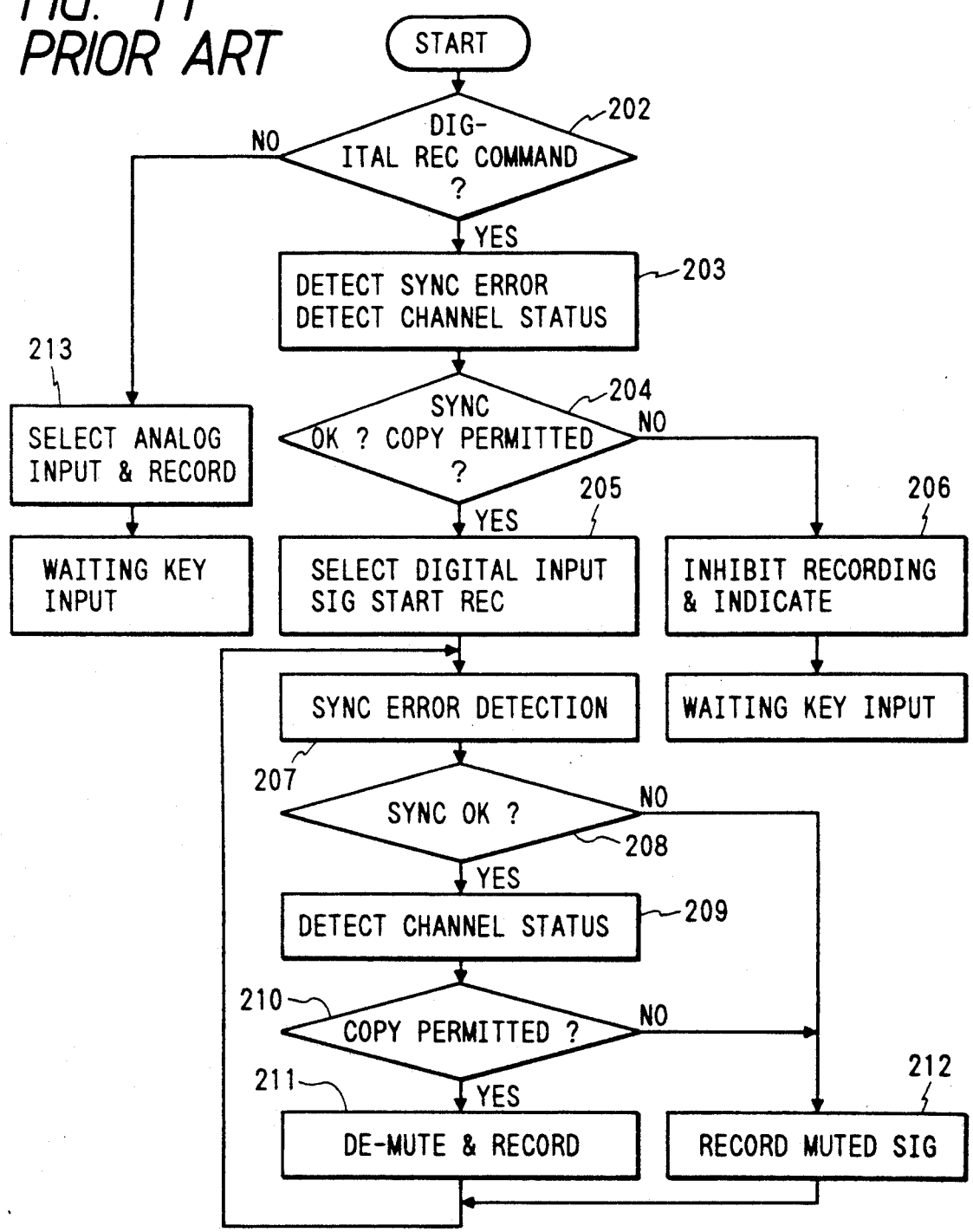
FIG. 11 is a flow chart used in the conventional device of FIG. 10.

FIG. 9 is a block diagram showing the fifth embodiment of the invention. FIG. 2 is a flow chart also showing the control operation of the fifth embodiment. The basic structure of the fifth embodiment of FIG. 9 is substantially the same as that of the fourth embodiment. A difference is that a muting circuit 31 is provided. Therefore, a detailed description is not necessary. The muting circuit 31 replaces the record signal with a mute signal in accordance with the control signal of the system control circuit 40. The fifth embodiment operates differently from other embodiments of the data recording apparatus. In step 122, the system control circuit 40 checks the output of the signal correlation detection circuit 84 (step 123). If it judges the output as not in correlation, circuit 40 controls the muting circuit 31 so that a muted signal is recorded (step 124). That is, if the signal inputted into the auxiliary analog signal input terminal 90 is different from that inputted into the digital signal input terminal 20, circuit 40 controls the muting circuit 31 to record the muted signal when these signals are inconsistent with each other. Thus, a problem results in that a desired recorded program on the magnetic tape 54 is mixed in with other programs. In step 124, in addition to this, an indication showing a muted signal being recorded is made to show that substitution recording with the analog signal is not permitted or that there is a problem. The operator can try again to record or can check digital signal lines or the auxiliary analog input lines. Thus, if there is no correlation, such an error condition is indicated as well as a problem that a desired recorded program is mixed in with other programs.

When the magnetic tape 54 recorded according to each embodiment is reproduced, a sub-code is recorded on the magnetic tape 54 because it is desired that a portion of the magnetic tape where analog recording is carried out be distinct from another portion when digital recording is carried out. The operation mode controlling circuit 43 receives a result from the digital copy permission/forbidden detection circuit 41 and sends it using the digital copy control signal to recording generation circuit 42. Then the result is converted into sub-cord format data by the sub-code encoder 51 to supply the sub-code format data to the record signal processing circuit 50. The record signal processing circuit 50 produces a record signal using the main data together with the sub-code data in accordance with a record format. The record signal is recorded by the head 53 on the magnetic tape. Therefore, when the recorded tape is reproduced it is possible to distinguish a portion where the analog signal is recorded from another portion where digital signal is recorded. This distinction can be utilized for indication. Such indication provides the operator with the history of the magnetic tape with respect to copying, so that it gives the operator useful information for operating and maintenance of the system and it removes the operator's feeling of uneasiness and a suspicion during operation.

In the above-mentioned embodiments, the system control is carried out using both data resulting from synchronizing error detection from the synchronizing error detection circuit 24 and a copying inhibition bit from the digital copy control signal detection circuit 22. However, only either data from the synchronizing error detection circuit 24 or from the digital copy control signal detection circuit 22 can be used for controlling, as clearly shown from the above-mentioned description. Each type of data occurs separately and each has separate function and effect.

This invention is not limited to a scope of the DAT, but is widely applicable to data recording apparatus for being capable of recording either analog or digital signal, for example, digital video tape recorded, AV disc recorder, or digital solid-state memory recorder, etc.

What is claimed is;

1. A data recording apparatus comprising;
   (a) an A/D converter for converting an analog input signal;
   (b) a digital decoder for decoding a digital input signal to obtain digital data and a synchronizing signal;
   (c) selecting means responsive to a control signal for selecting either an output of the A/D converter or said digital data for recording;
   (d) synchronizing error detection means for detecting synchronizing error through comparison between said synchronizing signal and a reference synchronizing signal; and
   (e) control means responsive to an output of said synchronizing error detection means for producing said control signal to cause said selecting means to select said output of said A/D converter when synchronizing error is detected.

2. A data recording apparatus as claimed in claim 1, wherein said control means produces the control signal in response to said output of said synchronizing error detection means to cause said selecting means to select said digital data when synchronizing error is removed.

3. A data recording apparatus comprising;
   (a) an A/D converter for converting an analog input signal;
   (b) a digital decoder for decoding digital input signal to obtain a digital data and a sub-code signal;
   (c) selecting means for selecting either an output of the A/D converter or said digital data in response to a control signal;
   (c) detection means responsive to said sub-code signal for detecting a copy control signal indicative of permission and inhibition of recording with said digital input signal; and
   (d) control means responsive to said detected copy control signal for producing said control signal to cause said selecting means to select said output of said A/D converter when said inhibition is detected.

4. A data recording apparatus as claimed in claim 3, wherein said control means produces said control signal in response to said detected copy control signal to cause said selection means to select said digital data when said detected copy control signal indicates said permission.

5. A data recording apparatus as claimed in claim 1, further comprising:
   (a) polarity difference detection means for detecting polarity difference between said output of said polarity changing means and said digital data, and
   (b) polarity changing means for changing polarity of said output of A/D converter in response to an output of said polarity difference detection means.

6. A data recording apparatus as claimed in claim 3, further comprising:
   (a) polarity difference detection means for detecting polarity difference between said output of said polarity changing means and said digital data, and
   (b) polarity changing means for changing polarity of said output of A/D converter in response to an output of said polarity difference detection means.

7. A data recording apparatus as claimed in claim 1, further comprising:
   (a) phase difference detection means for detecting phase difference between said output of said A/D converter and said digital data; and
   (b) time-adjusting means for adjusting time difference between said output of said A/D converter and said digital data in response to an output of said phase difference detection means.

8. A data recording apparatus as claimed in claim 7, wherein said phase difference detection means comprises:
   (a) first peak instant detecting means for detecting instance of a first peak of said output of said A/D converter for a given interval;
   (b) second peak instant detecting means for detecting instant of a second peak of said digital data for said given interval; and
   (c) time difference measuring means responsive to said detected instant of said first and second peak for producing said output of said phase difference detection means by measuring time difference therebetween.

9. A data recording apparatus as claimed in claim 3, further comprising:
   (a) phase difference detection means for detecting phase difference between said output of said A/D converter and said digital data; and
   (b) time-adjusting means for adjusting time difference between said output of said A/D converter and said digital data in response to an output of said phase difference detection means.

10. A data recording apparatus as claimed in claim 9, wherein said phase difference detection means comprises:
    (a) first peak instant detecting means for detecting instance of a first peak of said output of said A/D converter for a given interval;
    (b) second peak instant detecting means for detecting instant of a second peak of said digital data for said given interval; and
    (c) time difference measuring means responsive to said detected instant of said first and second peak for producing said output of said phase difference detection means by measuring time difference therebetween.

11. A data recording apparatus as claimed in claim 1, further comprising;
    (a) peak difference detection means for detecting peak value difference between said output of said A/D converter and said digital data; and
    (b) variable gain amplifier for amplifying said analog input with a gain determined by an output of said peak difference detection means.

12. A data recording apparatus as claimed in claim 11, wherein said peak difference detection means comprises:
- (a) first peak detecting means responsive to said output of said A/D converter for detecting peak value;
- (b) second peak time detecting means responsive to said digital data; and
- (c) a subtractor responsive to said first and second peak detecting means for producing said output of said peak difference detection means by subtracting.

13. A data recording apparatus as claimed in claim 3, further comprising;
- (a) peak difference detection means for detecting peak value difference between said output of said A/D converter and said digital data; and
- (b) variable gain amplifier for amplifying said analog input with a gain determined by an output of said peak difference detection means.

14. A data recording apparatus as claimed in claim 13, wherein said peak difference detection means comprises:
- (a) first peak detecting means responsive to said output of said A/D converter for detecting peak value;
- (b) second peak time detecting means responsive to said digital data; and
- (c) a subtractor responsive to said first and second peak detecting means for producing said output of said peak difference detection means by subtracting.

15. A data recording apparatus as claimed in claim 1, further comprising:
second selecting means responsive to first and second analog input signals for selecting either first or second analog input signal to producing said analog input signal in response to a second control signal,
said control means producing said fifth control signal such that when said control means produces said control signal to cause said selecting means to select digital data, it produces said second control signal to cause said second selecting means to change selection between said first and second analog input signal.

16. A data recording apparatus as claimed in claim 15, further comprising:
- (a) peak difference detection means for detecting peak value difference between said output of said A/D converter and said digital data; and
- (b) variable gain amplifier for amplifying said analog input with a gain determined by an output of said peak difference detection means.

17. A data recording apparatus as claimed in claim 3, further comprising:
second selecting means responsive to first and second analog input signals for selecting either first or second analog input signal to producing said analog input signal in response to a second control signal,
said control means producing said fifth control signal such that when said control means produces said control signal to cause said selecting means to select digital data, it produces said second control signal to cause said second selecting means to change selection between said first and second analog input signal.

18. A data recording apparatus as claimed in claim 17, further comprising;
- (a) peak difference detection means for detecting peak value difference between said output of said A/D converter and said digital data; and
- (b) variable gain amplifier for amplifying said analog input with a gain determined by an output of said peak difference detection means.

19. A data recording apparatus as claimed in claim 1, further comprising:
- (a) signal correlation detection means responsive to said output of said A/D converter and said digital data for detecting correlation between said output of said A/D converter and said digital data for producing a correlation signal; and
- (b) muting circuit responsive to said output of said A/D converter for producing a muted signal in response to a muting control signal, said control means producing said muting control signal when synchronizing error is detected.

20. A data recording apparatus as claimed in claim 3, further comprising:
- (a) signal correlation detection means responsive to said output of said A/D converter and said digital data for detecting correlation between said output of said A/D converter and said digital data for producing a correlation signal; and
- (b) muting circuit responsive to said output of said A/D converter for producing a muted signal in response to a muting control signal, said control means producing said muting control signal when said inhibition is detected.

* * * * *